O. HANSEN.
FLY TRAP.
APPLICATION FILED OCT. 21, 1918.
1,292,459.
Patented Jan. 28, 1919.
2 SHEETS—SHEET 1.
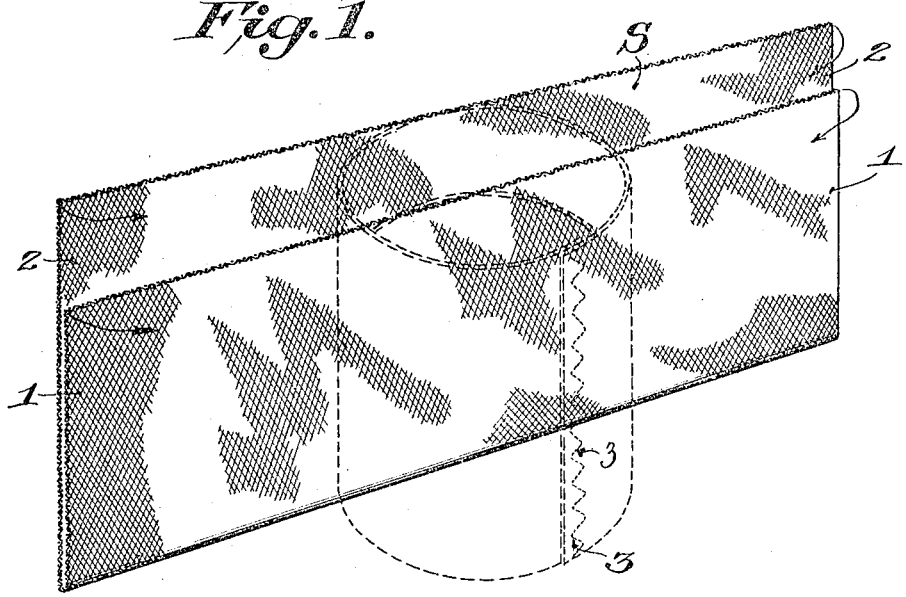
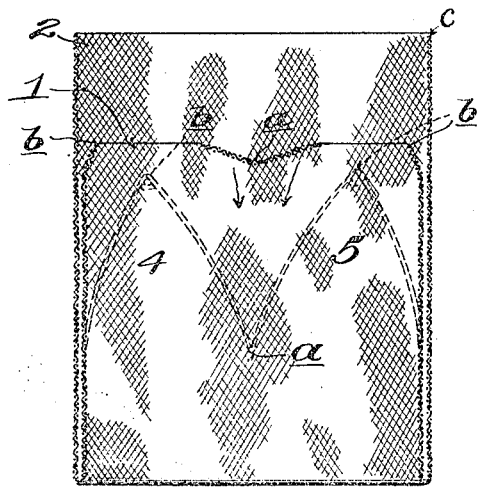
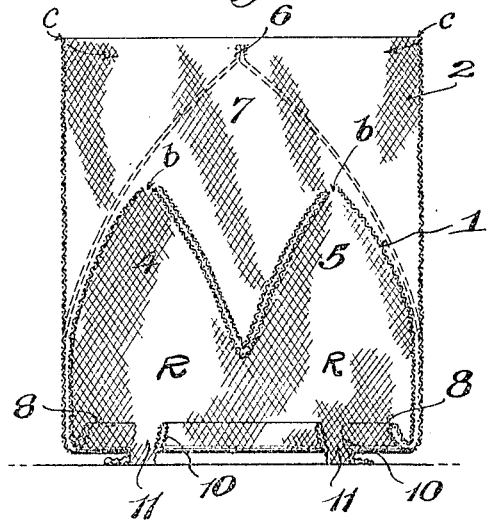
Inventor
Ole Hansen,
Attorney

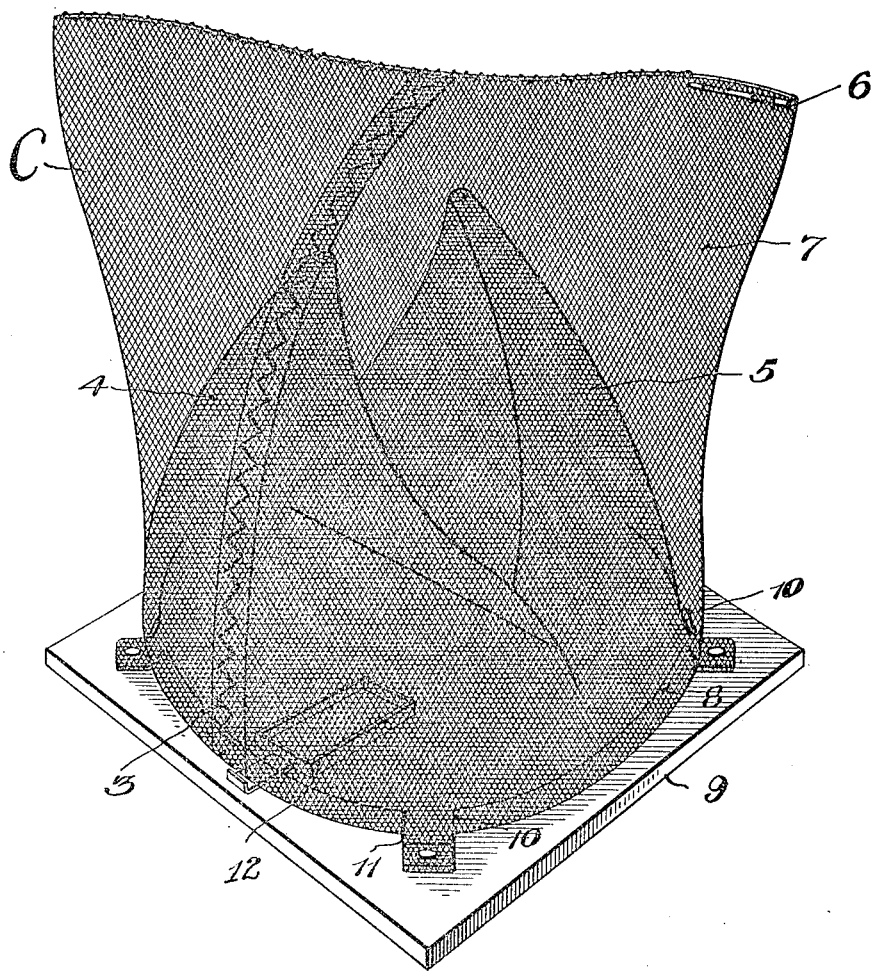

UNITED STATES PATENT OFFICE.

OLE HANSEN, OF LORENZO, IDAHO.

FLY-TRAP.

1,292,459.  Specification of Letters Patent.  Patented Jan. 28, 1919.

Application filed October 21, 1918. Serial No. 258,998.

*To all whom it may concern:*

Be it known that I, OLE HANSEN, citizen of the United States, residing at Lorenzo, in the county of Jefferson and State of Idaho, have invented certain new and useful Improvements in Fly-Traps, of which the following is a specification.

This invention relates to insect traps, and more particularly to a novel construction particularly adapted for catching flies.

A primary object of the invention is to provide a trap which may be made from a single piece of screen, in a rapid and expeditious manner, and without any special implements or tools. That is to say, the present invention has particularly in view a fly trap which may be made by simply bending a single piece of screen into such a form that a reliable and effective trap may be easily and quickly made.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which:—

Figure 1 is a more or less diagrammatic view showing a single screen sheet folded in accordance with the first step of making the present trap in full lines, and the bringing of the ends thereof together to form an open ended cylinder in accordance with the second step, in dotted lines.

Fig. 2 is a more or less diagrammatic sectional view on the line 2—2 of Fig. 1 showing the general cylindrical shape of the body in full lines, with the opposite edges of the inner wall portions folded down toward each other in dotted lines to form trapping cones with openings at their apices.

Fig. 3 is another diagrammatic sectional view showing the cones in full lines, the lower folded edge of the screen body turned in to form a trapping flange, and the latter being slit to form supporting feet, and also showing in dotted lines how the upper ends of the outer walls are brought together to form a cage portion above the cones.

Fig. 4 is a perspective view of the complete trap.

Similar reference characters designate corresponding parts throughout the several figures of the drawings.

In carrying the present invention into effect, it is proposed as previously indicated to utilize a single piece of screen wire of suitable dimensions which may be folded by a relatively few operations to produce a practical and efficient fly trap. In this connection it is to be noted that the invention is particularly adapted to be made without the use of special tools so that the trap may be easily constructed out in the open, as in camps, cantonments, and like places where flies become a nuisance and a menace to health.

By reference to Figs. 1 to 3 of the drawings, the manner in which the present trap is made may be readily observed. From Fig. 1 it will be seen that it is proposed to use a single screen sheet S of suitable length which is folded upon itself at one side of its medial portion to form a relatively short inner wall 1 and a relatively long outer wall 2. After the screen sheet is thus folded, the opposite ends thereof may be brought together as indicated by the dotted lines in Fig. 1 and secured by any suitable fastening means, such for instance as a wire thread 3 or the like. When the ends are thus brought together and fastened an open ended screen cylinder is formed with inner and outer walls and it is then proposed to bend the opposite upper edge portions *a* of the inner wall 1 downward and toward each other until they come into overlapping relation to thus provide a pair of interior trapping cones 4 and 5 (Fig. 2) having suitable outlet openings *b* at their apices.

After the meeting edge portions of the inner walls have been secured together to permanently form the cones 4 and 5, the opposite upper edges *c* of the outer wall 2 are brought toward each other and fastened together (Fig. 3) by a suitable wire thread or the like with the possible exception of one corner which may be left unsecured but closed by a removable fastening 6 such as a wire nail or its equivalent to thus provide an outlet for removing the dead flies which have accumulated in the cage formed by bringing the upper ends of the outer walls together. In connection with the formation of the cage 7 over and above the apex of the cones 4 and 5, it may be noted that it is preferred to bring the upper edges of the outer wall 2 together in a plane at right angles to a plane intersecting both of the apices of the cones to thus provide an enlarged cage 7 whereby a greater number of flies may be accommodated.

As also shown in Fig. 3 of the drawings, it is proposed to bend the lower rolled edge of the screen sheet inwardly to form a fly trapping flange 8 which will materially assist in preventing the escape of flies after they are once confined within the space forming the base of the cones 4 and 5. And, in order to support the entire trap a sufficient distance above a suitable base 9, to provide entrance clearance, it is proposed to make adjacent slits 10 in the flange 8, whereby the portion of the wire 11 between the slits may be bent downwardly and outwardly to form supporting feet, which in addition to providing room for the flies to enter also permits the insertion of a bait dish 12.

Accordingly, by reference to Fig. 4 of the drawings it will be observed that a complete and efficient fly trap may be readily provided, the same comprising a relatively large exterior cage portion C which envelops a pair of interior trapping cones 4 and 5 having suitable outlets at their apices to establish communication between the entrance chamber which is common to both of the cones, and the interior of the cage formed by bringing the upper edges of the outer walls together. When the flies are attracted to the trap by the bait on the bait dish they will of course be held within the receiving chamber R at the base of the cones, and owing to the inturned trapping flange 8 will be prevented from following the sides of the trap in order to escape. The flies thus held within the receiving chamber gradually find their way up into the cones and thence out of the openings at the apices of the latter into the trapping cage C where they are of course held until their destruction may be conveniently carried out either with the aid of scalding hot water or over a fire. The dead flies may be easily removed from the cage by removing the detachable fastening 6 or its equivalent at one corner as previously described.

Without further description it is thought that the many features and advantages of the one-piece trap will be readily apparent.

I claim:—

1. A fly trap formed from a single sheet of screen material folded upon itself and having its folded edge turned inwardly producing a bottom trapping flange, and said screen material being formed above said flange with an enlarged cage portion and interior trapping cones.

2. A fly trap formed from a single piece of screen folded upon itself to form relatively long and short walls, the opposite ends of which latter are drawn together to form a cylinder, said short wall having its opposite edge portions bent downwardly toward each other to produce opposite cone elements each having an outlet at its apex, and said long wall having its opposite edge portions fastened together to provide a cage portion over and above the outlet ends of said cone elements.

3. A fly trap formed from a single piece of screen folded upon itself to provide a relatively short inner wall and a relatively long outer wall, and then rolled into the form of a cylinder, a pair of trapping cones each having an opening at its apex formed by bending down and fastening together opposite portions of the inner wall, and fastenings for securing together the upper ends of the outer wall to provide an enlarged cage portion over and about the cones.

4. A fly trap formed from a single piece of screen and consisting of interior cones having openings at their apices and an enlarged cage portion enveloping said cones, an in-turned trapping flange formed at the lower edge of the screen at the base of the cones, supporting feet also formed from the lower edge of the screen, and a base to which said feet may be secured.

5. A fly trap formed from a single piece of screen folded upon itself to provide inner and outer walls, a pair of trapping cones having outlets at their apices formed by bending the opposite edge portions of the inner wall toward each other and downward and securing the same together, whereby the said cones have a common entrance, and fastenings for securing together the upper edge of the outer walls in a plane at right angles to a plane intersecting both apices of the cones to thereby provide an enlarged cage portion.

6. A fly trap formed from a single piece of screen folded upon itself to provide a relatively short inner wall and a relatively long outer wall, and having its opposite ends brought together to form a cylinder, an annular trapping collar formed by bending the folded edge of the screen inward, supporting feet formed by making adjacent slits in the annular flange and bending the material between the slits downwardly and outwardly, trapping cones having outlets at their apices and formed by bending down and fastening together opposite edge portions of the relatively short inner wall, and fastening means for holding the upper edge portions of the outer wall together to form an enlarged cage portion over and about the cones.

In testimony whereof I hereunto affix my signature in the presence of two witnesses.

OLE HANSEN.

Witnesses:
 ERNEST P. PAMMENT,
 EDITH HALVERSON.

Copies of this patent may be obtained for five cents each, by addressing the "Commissioner of Patents, Washington, D. C."